United States Patent [19]

Meijer

[11] 3,824,585

[45] July 16, 1974

[54] PYROMETER WITH DIGITALIZED LINEARIZING CORRECTION HAVING PROGRAMMABLE READ ONLY MEMORY

[75] Inventor: Robert S. Meijer, Chicago, Ill.

[73] Assignee: Alnor Instrument Company, Division of Illinois Testing Laboratories, Inc., Chicago, Ill.

[22] Filed: June 20, 1972

[21] Appl. No.: 264,616

Related U.S. Application Data

[63] Continuation-in-part of Ser. No. 152,702, June 14, 1971.

[52] U.S. Cl... 340/347 NT, 340/347 AD, 235/92 R, 235/92 PL

[51] Int. Cl. .......................................... H03k 21/34

[58] Field of Search ........... 340/347 NT; 235/92 PL

[56] References Cited

UNITED STATES PATENTS

| | | | |
|---|---|---|---|
| 3,209,130 | 9/1965 | Schmidt | 235/92 PL |
| 3,349,390 | 10/1967 | Glassman | 340/347 AD |
| 3,617,885 | 11/1971 | Wheable | 340/347 NT |
| 3,686,665 | 8/1972 | Elias | 340/347 AD |

*Primary Examiner*—Paul J. Henon
*Assistant Examiner*—Robert F. Gnuse
*Attorney, Agent, or Firm*—Silverman & Cass

[57] ABSTRACT

By feeding BCD temperature representing count pulses into a read only memory (R.O.M.) which feeds into simple gating logic, progressively selected count pulses are discarded to cause a nonlinear thermocouple response to become linearized. The thermocouple response is fed into an improved dual slope integrator; whereby, pulse width modulation becomes a related measurement of sensed temperature. The R.O.M. enables the linearized output to be subdivided into many linear sections for greatly improved tracking of the linearized curve.

16 Claims, 4 Drawing Figures

PATENTED JUL 16 1974 3,824,585

PYROMETER WITH DIGITALIZED LINEARIZING CORRECTION HAVING PROGRAMMABLE READ ONLY MEMORY

CROSS REFERENCE TO RELATED APPLICATIONS

This application is a continuation-in-part of my copending application "Pyrometer With Digitalized Linearizing Correction," Ser. No. 152,702, filed June 14, 1971.

BACKGROUND OF THE INVENTION

This invention concerns a pyrometer and, more particularly, an especially accurate, fast responding electronic pyrometer with digitalized linearization, having a R.O.M.

The nonlinear output response of thermocouples, and for that matter other types of transducers, has long been recognized. As technology progressed, the need for greater measurement accuracy proportionately increased, such that at the present time one or two percent of error in various measurements, such as temperature, has become significant. Often, because of the nature of an input transducer, errors are progressive and, with a linear indicator, a tolerable degree of error at the low end of the range soon changes to an unacceptable quantum of error by midrange and thereabove. Often the error is monotonic in nature, as is known in thermocouples.

Such nonlinearity has been dealt with previously by the use of compensating meter movements which are designed to possess an equal, yet opposite nonlinear response characteristic. Nonlinear electronic elements, such as diodes and potentiometers have been employed for linearization. Servo mechanisms of varying complexity and cost also have been employed.

The known prior art has been of the type in which linearization has been accomplished primarily in an analog method; hence, there has been the need for apparatuses which typically are costly, occupy a relatively large amount of space, are slow to react and are subject to the inertia disadvantage of overshoot.

Most, if not all of the prior art deficiencies can be overcome by analog to digital conversion of the error and digitalized linearization.

Often, the linear approximation changes from one part or section of a response to the next. As a result, a meter or the like, which could provide only a single amount of linearizing correction, or even a few steps of correction, was limited in its linear accuracy. The answer to such problem is to provide numerous discrete amounts of correction for application progressively, when needed. Unfortunately, the prior art lacked such versatility, without the use of networks requiring analog weighting circuitry or complex logic circuits committed to only one specific response.

SUMMARY OF THE INVENTION

It is a primary object of this invention to provide an improved pyrometer which is digitally linearized with high precision with the aid of a programmable read only memory (R.O.M.).

The above and other objects of the invention are accomplished by feeding the thermocouple output to a dual slope integrator specially designed such that 1° of temperature will be made to equal to one eventually resulting, digitalized count pulse with great precision. The thus generated temperature-related, pulse width modulated signal is employed for generating and gating a strobe signal which causes the linearized and digitalized temperature value to be latched for display on indicators and made electrically in BCD format. As the BCD value is being accumulated digit by digit, those coded BCD counts are fed into the linearizing circuit, which gates a continuous train of clock pulses into BCD counters. The linearizing circuit has at its input a R.O.M. which programs a plurality of responses by the linearizer. All clock pulses are gated, except for those selected by the linearizer for exclusion, such that the monotonic error progression is suppressed and the gated clock pulses become a train of linearized count pulses which is strobed, as above noted, so that at the time of the strobe, the temperature value is in the BCD counters.

Figures 1, 2, 3, 4:
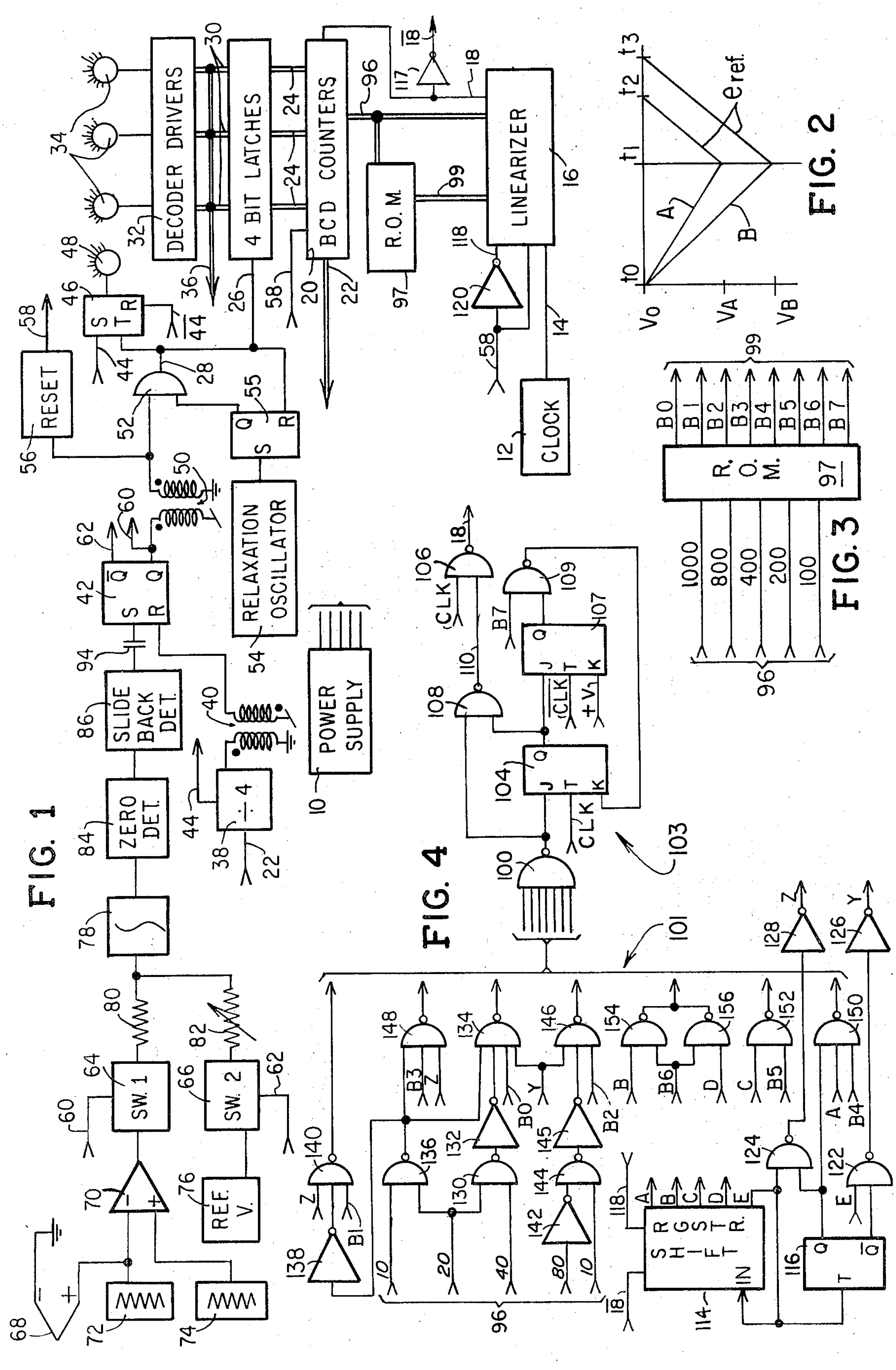
FIG. 1 is a schematic of the subject pyrometer.
FIG. 2 is a voltage chart relating to the dual slope operation.
FIG. 3 is a block diagram of a R.O.M. with its input and output leads.
FIG. 4 is a schematic of the linearizing circuit.

Wherever possible, the nomenclature and reference numbers herein employed are the same as those employed in the cited parent application.

DISCLOSURE OF THE PREFERRED EMBODIMENT

With reference to FIG. 1, a floating power supply 10 is shown with a plurality of outputs; however, for simplicity of illustration and discussion the interconnections from the power supply to the other circuit elements have been omitted as well as the power transformer input to the power supply. It will be appreciated that several voltage levels and a common level are provided by the power supply 10.

A clock 12 is energized by the power supply and generates a continuous train of clock pulses, such as at the rate of 750 KHz. A free running multivibrator will function well for this clock. An output line 14 connects the clock pulses to a linearizer 16, the contents and detailed operation of which will be discussed subsequently with reference to FIG. 4. It is sufficient for the moment to state that the linearizer suppresses selected of the clock pulses and passes to its output line 18, a linearized train of count pulses for receipt of a plurality of interconnected BCD counters 20.

As well known in the art, binary coded decimal (BCD) devices operate upon the digit values of 1, 2, 4 and 8. In the present embodiment, three BCD counters 20 are employed with carry connections, such that they can receive up to the pulse count value of 999 before overflowing. Upon overflowing, an overflow or 1,000 count signal is placed on a line 22 for timing purposes, soon to be discussed. By conduits 24, the BCD values are applied to four-bit latches 26 and when the latter are strobed by a strobe signal on a line 28, they transfer, via conduits 30, to decoder drivers 32, for energizing of numerical indicating tubes 34, the BCD values they are then receiving. At the same time the BCD count value is placed on a BCD readout conduit 36 for recording purposes. Such counters, latches, drivers and indicating tubes are well known in the art and can be obtained in commercial packages.

The above mentioned 1,000 count signal on the line 22 is applied to a divide by four circuit 38, which can comprise a pair of flip-flops, and generates a 4,000 count output. This output is applied to a transformer 40 which resets a flip-flop 42 to thereby establish a fixed count duration for the first half of the dual slope integration operation. Such fixed count duration is shown in FIG. 2 as lying between times $t_0$ and $t_1$. During the second half of the dual slope operation, between $t_1$ and for example $t_2$, which is at a "return to $V_0$" condition, the number of count pulses which are fed into the BCD counters by the time that the slope signal returns to $V_0$ is the linearized temperature being measured. If by that time between $t_1$ and $t_2$ there is an overflow signal on the line 22, a response signal is emitted from the divide by four circuit on an output line 44, and such signal is gated by a flip-flop 46 with the strobe signal on the line 28 to thereby turn on a lamp 48, which represents the 1,000 count value.

Whenever, during the second half of the dual slope operation, the integrated value returns to $V_0$, the flip-flop 42 changes state and produces an output which is applied to a transformer 50. That "zero return" output is gated by a gate 52 with the output from a relaxation oscillator 54 to generate the strobe signal for the strobe line 28. Connected between the output of the relaxation oscillator and the gate 52 is a set reset flip-flop 55 that is set by the oscillator and reset by the trailing edge of the strobe signal. The relaxation oscillator has a relatively slow repetition rate, such as one second, so that there is sufficient visual resolution of the indicator tubes 34 when strobed, otherwise the visual readout might be difficult to see, even though precisely accurate, the zero return signal also triggers a reset element 56 having an output line 58 that is coupled to several of the circuit portions, as shown.

The flip-flop 42 also has a pair of complementing output lines 60 and 62 which change state at each time $t_1$ and whenever the integrated slope voltage is at $V_0$. A pair of parallel switches 64 and 66 are separately enabled by the output lines 60 and 62 such that at any one time only one of these switches is enabled. More specifically, the first switch 64 is enabled during the first half of each integration, i.e., between $t_0$ and $t_1$, while the second switch 66 is disabled, and the second switch is enabled at $t_1$, when the first switch is disabled.

The switch 64 receives the anolog of the millivolt output from a thermocouple 68 by way of an operational amplifier 70. The amplifier allows the thermocouple to see a high impedance and also amplifies its output voltage. A nickel spool 72 and a manganin spool 74 provide cold end compensation and offset, in the manner known in the pyrometer art. Reference voltage means 76, such as a Zener diode circuit, provides a reference voltage to the second switch 66, whereby a fixed voltage $e_{ref}$ will be generated and at time $t_1$ be fed to an integrator 78. As shown in FIG. 2, the thus formed reference voltage $e_{ref}$ produces a fixed slope, independent of the voltage level at which it commences at the time $t_1$.

Accordingly, if the amplified thermocouple output through the first switch 64 represented a temperature A, there would be integrated a ramp signal A, commencing at the time $t_0$ and terminating at the time $t_1$. The duration $t_0$ to $t_1$, it will be recalled, is fixed, always being 4,000 count pulses in duration. At time $t_1$, the flip-flop 42 changes state and causes the first switch 64 to stop transmitting the thermocouple data to the integrator 78, and then the second switch 66 feeds the reference voltage to the integrator until the time $t_2$, when the ascending slope $e_{ref}$ returns to $V_0$. The flip-flop 42 again changes state, as next will be discussed, and the cycle repeats itself.

If at $t_0$ the thermocouple 68 was reporting a temperature B which was greater than the temperature A, a descending ramp B would be formed, as shown in FIG. 2, and cause the associated ascending reference voltage ramp to attain $V_0$ at the time $t_3$. It now will be appreciated that the input temperatures are proportional to the duration of the ascending ramp voltages, and that such duration is subdivided by the train of clock pulses into a digitalized representation of the temperature, which is then linearized by the digitalized linearizer 16 such that each count pulse passed therefrom to the BCD counters 20 represents 1° of temperature for readout purposes.

As shown in FIG. 1, the output from the first switch 64 is applied to a resistor 80 and the output from the parallel switch 66 is applied to a variable resistor 82. By use of the variable resistor 82, the ascending slope $e_{ref}$ can be fine tuned for precise matching of one count pulse to one degree of temperature. In previously known dual slope integration, the just described configuration was unknown and fine tuning was attempted by shifting the voltage gain of the input amplifier 70, a less desirable and less precise arrangement.

A zero detector 84 follows the output of the integrator 78 and whenever $V_0$ is attained the detector produces the characteristic "zero return" output earlier discussed. The switchover time or slewing rate of the zero detector 84 is a significant parameter, the faster it is, the more precise will be the entire timing — temperature measuring — relationship. As well known, fast slewing rates are costly to purchase. To reduce this problem, a slide back detector 86 is coupled between the zero detector and flip-flop 42 for the purpose of switching faster than the slewing rate of the zero detector.

The zero detector can be an operational amplifier circuit which feeds into the gate electrode of a programmable unijunction element. By its nature, a programmable unijunction has a very strong anode to cathode conduction as soon as it turns on, i.e., as soon as its gate is below its anode by a certain value. During the quiescent time period when the zero detector 84 is not slewing, a capacitor, which is coupled to the output of the unijunction, is being charged. However, very soon after the slewing starts, the gate is forced sufficiently below the anode of the unijunction to effectively short circuit this element to ground and thereby rapidly feed a strong input to a coupling capacitor which feeds to an input of the flip-flop 42, as shown in FIG. 1.

As shown in FIG. 1 and with reference to FIGS. 3 and 4, a bundle 96 of BCD lines from the BCD counters 20 is connected to linearizer 16 and to a programmable read only memory (R.O.M.) 97. For purposes of the following discussion, an example of a preferred embodiment, it is to be assumed that the R.O.M. has five inputs and eight outputs. The inputs are the separate BCD count value lines 100, 200, 400, 800, and 1,000; and the output lines are labelled B0 to B7, respectively, and are represented by the bundle 99 in FIGS. 1 and 3, which lines are coupled to inputs of the linearizer 16 as shown in FIG. 4.

Although R.O.M. elements are believed to be well known, next follows a few words of explanation of their basic operation as herein employed. The five input lines act as address lines which, if operated in a binary mode, can define 32 different addresses of eight bits each. Since the example herein is BCD, only the 20 addresses representing separately 0–99, 100–199 etc., are employed; hence, each address represents a different successive 100° F segment of the thermocouple range. Each address value can be coupled to define an output which causes an output response on any one or ones of the output lines B0 to B7. In the present example, each output line will elicit a different number of the clock pulses to be excluded from contributing to the recorded and linearized temperature count output. Specifically, B0 through B6 will respectively exclude 1, 2, 4, 8, 10, 20 or 40 clock pulses when addressed individually; whereas, the combination of more than one of these lines when addressed will act to exclude the sum of their individual values; moreover, when B7 is addressed, it will multiply by two the value of the other addressed values.

Hence, for any addressed segment of 100°, i.e., 100 count pulses, a total number of from zero to 170 clock pulses can be excluded, which is an infinite selection, for all practical purposes. Thus, it could require up to 270 clock pulses to generate 100 count pulses.

Once the input-address-output relationships are determined, the R.O.M. chip 97 is programmed, as by known fusing procedures, and then installed in a system, as shown in FIGS. 1 and 4. In the event that the system, in this case a pyrometer, is to be employed subsequently in a manner which requires significantly different programming, the R.O.M. chip 97 can be replaced by a different R.O.M. chip that has been programmed appropriately, such as for use with a different type of thermocouple having different nonlinear responses within the various 100° segments. Nevertheless, the same input and output lines 96 and 99, having the same input-output values, but different address relationships, would be employed. Thus, the configuration next to be discussed with reference to FIG. 4 would be commonly employed, independent of the internal programming of the R.O.M. 97.

The linearizer 16, as shown in FIG. 4 can be divided into two portions "input gating" 101 and "output suppression" 103, respectively, with a NAND gate 100 defining the input element of the output suppression portion 103. In many respects the output suppression portion operates in the manner described in the cited copending parent application, except for the multiply by two operation, next to be discussed.

With reference to the output suppression portion 103, the clock pulses ($\overline{CLK}$) are fed into a JK flip-flop 104 and a NAND gate 106; whereas, clock-not (CLK) pulses are fed into a JK flip-flop 107. The Q output of the flip-flop 104 is connected to the J input of the flip-flop 107, the Q output of which is applied to a gate 109. The B7 output line from the R.O.M. 97 provides the other input to the gate 109, the output of which feeds back to the K input of the flip-flop 104. The elements 107 and 109 provide the multiply by two function, as will be explained. The goal of the output suppression portion 103 of the linearizer 16 is to selectively suppress some of the clock pulses that are fed to the gate 106 so that all count pules from its output 18 are temperature linearized. Also as shown, a gate 108 receives as inputs the output from the gate 100 and the Q output from the JK flip-flop 104 to thereby define a suppression signal on its output line 110, which controls the linearizer output gate 106.

Normally, all of the command outputs from the input gating portion 101 which feed into the input gate 100 are logically high signals; hence, the output from the NAND gate 100 normally is low. This normal condition causes the NAND gate 108 to produce a logically false output, which is a high signal on the line 110, to thereupon enable the output gate 106 to pass each received clock pulse as a count pulse. Hence, under normal input conditions to the gate 100, no clock pulses are suppressed. In the event when any of the inputs to the gate 100 goes low, its output goes high, half enables the gate 108 and when CLK goes low a true output is on the line 110, which being low inhibits the gate 106 from passing clock pulses for the duration of this suppression condition.

It will be appreciated that the flip-flop 104, by responding to its input conditions, divides the clock frequency by two and thereby provides an output to the gate 108, at the end of each suppression operation, to place a signal on the input line 110 to provide required logic gating conditions for the next clock pulse to pass through the gate 106. Otherwise, if the gate 106 was to remain inhibited, no further count pulses could be transmitted on the output line 18 to the BCD counters 20 and from there back into the linearizer 16 by way of the BCD bundle 96. In that event, the entire pyrometer function would be terminated after the first suppressed clock pulse. Thus, by operating the flip-flop 104 in the toggle mode, there is provided a circuit loop which terminates the suppression operation. In this manner, whenever the gate 100 injects a suppression operation and the multiply by two signal on the line B7 is present, an added clock pulse is suppressed for each clock pulse designated; hence, a two to one or "multiply by two" condition is established.

The input gating portion 101 of the linearizer 16 comprises a plurality of NAND gates, inverters, a shift register 114 and a flip-flop 116. The shift register is in the form of a five bit ring counter with the five output lines designated A, B, C, D, and E. The line E is fed back to an IN input in typical ring counter mode. The input pulses are provided by an $\overline{18}$ line which is derived from an inverter 117 which is connected to the output 18 of the linearizer 16, as shown in FIG. 1. An input line 118 provides a SET E signal, for initially setting the E position to a logic 1 state. The derivation of the SET E signal comes from the reset element 56 in FIG. 1, when the reset output line 58 is inverted by an inverter 120 and fed into the linearizer 16 on the line 118, as shown in FIG. 1. Accordingly, upon reset of the system, the E bit line will be set to 1 so that, upon the first $\overline{18}$ pulse of the next temperature measurement, all bits A through D will be a logic 0. Not shown specifically in FIG. 4, but shown in FIG. 1 is the reset output 58 being fed into the linearizer 16. The reset signal resets the flip-flops 104, 107, and 116 and clears the shift register 114.

The five bits of the shift register 114 each represents two different units positions digits as follows: A:1 and 6; B:2 and 7; C: 3 and 8; D:4 and 9; E:5 and 0. As shown, the E line feeds into the toggle input of the flip-flop 116 for changing the Q and $\overline{Q}$ outputs each 5th of the $\overline{18}$ signals. Connected in this manner, clock pulses having units value of 1 through 5, 11–15, 21–25, etc. produce a logically true output from the $\overline{Q}$ output of the flip-flop 116; and clock pulses 6 through 10, 16–20, 26–30, etc. produce a logically true output from the Q output of the same flip-flop. Both of these $\overline{Q}$ and Q outputs are gated with the E output by gates 122 and 124, respectively, and are respectively inverted by inverters 126 and 128 to provide on their output lines Y and Z signals representing each fifth clock pulse; line Y going true on the fifth, 15th, 25th, etc. pulse and line Z going true on the 10th, 20th, 30th, etc. pulse.

By logically combining the outputs B0 to B6 from the R.O.M. 97 with the outputs A to D, from the shift register 114, as well as the outputs Y and Z derived from the output E, and the BCD outputs 10, 20, 40 and 80 in the bundle 96 in the manner shown in FIG. 4, seven suppression command inputs to the NAND gate 100 will be provided for suppressing 1, 2, 4, 8, 10, 20 and 40 clock pulses, as earlier discussed. Specifically, for each segment of 100 count pulses, each of the R.O.M. outputs B0 to B6 can be employed to suppress certain of the clock pulses. From the following chart it will be seen that none of the R.O.M. lines duplicates any pulse suppression; hence, the different line suppressions can be added directly.

In identifying the clock pulse which is suppressed, the suppression triggering count pulse is listed on the chart for clarity. It should be remembered that the clock pulse following the count pulse is suppressed and thus not counted. For example, to suppress two clock pulses via the B1 control, the 35th count pulse will cause the 36th clock pulse to be not counted; hence, the 37th clock pulse will become identified as the 36th count pulse. Now when the 75th count pulse arrives (76th clock pulse), it will cause the next clock pulse, the 77th, to be suppressed; thus, the 76th count pulse is derived from the 78th clock pulse. Accordingly, if all lines B0 to B7 were enabled, the 100th count pulse would be derived from the 270th clock pulse.

| R.O.M. Line | Suppressions | Suppression Count Pulses |
|---|---|---|
| B0 | 1 | 60 |
| B1 | 2 | 35, 75 |
| B2 | 4 | 10, 30, 50, 70 |
| B3 | 8 | 5, 15, 25, 45, 55, 65, 85, 95 |
| B4 | 10 | 1, 11, 21, 31, 41, 51, 61, 71, 81, 91 |
| B5 | 20 | 3, 8; 13, 18; 23, 28; 33, 38; . . . . 93, 98 |
| B6 | 40 | 2, 4, 7, 9; 12, 14, 17, 19; . . . . 92, 94, 97, 99 |

To suppress one clock pulse, that one being after the 60th count pulse, the BCD 20 and 40 lines are gated by NAND gate 130 and inverted by an inverter 132 which feeds into a NAND gate 134. The gate 134 also has inputs from the lines Y and B0 as well as from the output of a NAND gate 136, which gates the BCD count values of 10 and 20. Basic BCD notation, when applied to gating operations, causes the gate 130 to be true during count pulses 60 to 79 and the gate 136 to be false for the 70th count pulse; hence, their inputs to the gate 134 will be true for count pulses 60 to 79, except for pulse 70. Since the Y line is true for each ten's value, only the 60th count pulse will be gated through the gate 134, when enabled by the B0 line, for suppressing the next clock pulse (61st) by way of the NAND gate 100 and the suppression circuitry 103.

For suppression of two clock pulses, the gate 136 passes the count pulses 30 to 39 and 70 to 79 through an inverter 138 to a NAND gate 140. This NAND gate 140 has as its other selecting input the Z line, which selects the 35th and 75th count pulses as the trigger pulses for excluding the respectively following two clock pulses (36th and 77th), if the enabling line B1 then is the programmed output from the R.O.M. 97 to the gate 140 and from there to the gate 100.

To suppress four clock pulses, the BCD value of 80 line is inverted by an inverter 142 and gated with the BCD 10 value by a gate 144. The output of the gate 144 is inverted by an inverter 145 and then gated by a gate 146 with the Y control line (decimals 10's line) such that only the four odd valued tens (10, 30, 50, 70), except for the 90th count pulse, become the trigger pulses for excluding the clock pulse following each.

To suppress eight clock pulses in any one segment of one hundred count pulses, the Z line feeds each of the fifth, 15th, 25th . . . 95th pulse to a NAND gate 148 which is enabled by the B3 line. However, the gate 136, which operates on the 30's and 70's decades, is coupled to the gate 148 and blocks the 35th and 75th pulse from being an output to the gate 100; hence, only the eight count pulses shown on the chart can act as suppression triggers.

Ten clock pulses are suppressed by way of a gate 150 that receives from the Q line of the flip-flop 116 high signals for pulses 1 through 5 of each decade, and which also receives a high signal from the A line of the shift register 114 for each first and sixth count pulse. Thus, only the first pulse of each decade (1, 11, 21, etc.) is gated when the B4 line enables the gate 150.

In a similar manner a NAND gate 152 receives each third and eighth pulse on the C line and is enabled by the B5 line for a total of 20 suppressions per hundred.

Likewise, a pair of gates 154 and 156, with their outputs being coupled and both being enabled by the R.O.M. output B6, each generate 20 suppression triggers for a total of 40 to the gate 100. Specifically, the gate 154 controls each decade's second and seventh pulse; whereas, the gate 156 controls the fourth and ninth pulse in each of the 10 decades of a segment.

As earlier described, whenever the B7 output is programmed, a second clock pulse is suppressed for each one suppressed by way of B0 to. B6; hence, the multiply-by-two clock pulse function suppression is accomplished and such can be for any combination of B0 and B6 programming with B7.

From an examination of the "Suppression Count Pulses" portion of the above presented chart, it will be appreciated that the occurrences of pulse suppression, which is selected by the R.O.M. outputs, is symmetrical within the segment of 100 count pulses. Such symmetry minimizes error accumulation within the segments, each of which, according to the presented example, represents 100°F.

The following chart presents the R.O.M. outputs and the total number of clock pulse suppressions for each 100°F segment up to 2,000°F for a J-type of thermocouple, the response of which can be linearized according to this invention.

For example, in the segment between 1,300° F and 1,400°F, when employing a J-type of thermocouple, the R.O.M. is programmed to provide the suppression outputs B0, B1 and B5, for generating a total of 23 clock pulse suppressions — one from B0, two from B1 and 20 from B5. If the monitored temperature was 1,396°F, 101 pulse suppressions would have been generated prior to the temperature count of 1,300, by the R.O.M. programming, and 22 of the 23 suppressions would have been generated between the counts of 1,300 and 1,396; the twenty-third suppression requiring the 1,398th count pulse for suppression the next following clock pulse. Thus, the accumulation of error would be less than one degree, and such should be the result throughout the entire range of the linearization according to this invention.

| °F | R.O.M. OUTPUTS | TOTAL SUPPRESSIONS |
|---|---|---|
| 0–100 | None | 0 |
| 100–200 | B0, B1 | 3 |
| 200–300 | B0, B2 | 5 |
| 300–400 | B0, B1, B2 | 7 |
| 400–500 | B3 | 8 |
| 500–600 | B1, B2 | 6 |
| 600–700 | B0, B1, B2 | 7 |
| 700–800 | B1, B2 | 6 |
| 800–900 | B0, B1, B2 | 7 |
| 900–1000 | B3 | 8 |
| 1000–1100 | B0, B4 | 11 |
| 1100–1200 | B0, B2, B4 | 15 |
| 1200–1300 | B3, B4 | 18 |
| 1300–1400 | B0, B1, B5 | 23 |
| 1400–1500 | B1, B5 | 22 |
| 1500–1600 | B1, B2 | 22 |
| 1600–1700 | B1, B5 | 22 |
| 1700–1800 | B1, B5 | 22 |
| 1800–1900 | B0, B1, B5 | 23 |
| 1900–2000 | B1, B5 | 22 |

From the foregoing, the detailed operation of the subject pyrometer, with its R.O.M. improved digitalized linearizer, should be well understood by those skilled in the art, whereby the scope of this invention, as set forth in the following claims, will be appreciated.

What is desired to be secured by Letters Patent of the United States is:

1. Digitalized linearizing correction circuitry for use in a pyrometer having dual slop integration means which includes input means for receiving separately the analog signal of variable temperature measurements and a fixed reference signal, integrating means coupled to said input means, and an output at which appear sequentially a first and second ramp signals of opposite polarity, representing the reference and temperature input signals, respectively; clock pulse generating means for supplying a train of clock pulses; and pulse counting means having an input and a plurality of discrete numeric outputs; said linearizing circuitry being connected to receive said train of clock pulses and said numeric outputs and having an output coupled to said input of said pulse counting means, said linearizing circuitry including logic gating means interconnected for response to said discrete outputs for generating a plurality of periodically repeating clock pulse suppression signals for inhibiting the passage of numerically selected ones of said clock pulses to said pulse counting means; said logic gating means including an input gating portion having logic elements and an output, a read only memory (R.O.M.), and an output suppression portion; said R.O.M. and the logic elements of said input gating portion both being connected to receive said numeric outputs from said pulse counting means, the R.O.M. employing said numeric outputs as input address lines for defining a plurality of different suppression responses for association with temperature range segments of the pyrometer, and said R.O.M. having output lines for connecting said different suppression responses to the logic elements of said input gating portion, whereby said input gating portion generates and couples to said output suppression portion discrete and selective output command signals for the generation of said suppression signals.

2. Digitalized linearizing correction circuitry according to claim 1 in which said input gating portion includes clock pulse receiving and digitally identifying means having outputs connected to said logic elements.

3. Digitalized linearizing correction circuitry according to claim 2 in which said identifying means comprises a shift register for receiving the clock pulses and providing output responses indicative of the decimal values of zero through nine, and a bistable device coupled to respond to an output from the shift register to provide separate responses for the alternating first and second five unit values of each decade of clock pulses.

4. Digitalized linearizing correction circuitry according to claim 1 in which said pulse counting means is arranged to operate in a BCD mode, the R.O.M. is coupled to respond to the input count values of 100, 200, 400, 800 and 1,000, and said logic elements are coupled to respond to the count values of 10, 20, 40 and 80.

5. Digitalized linearizing correction circuitry according to claim 1 in which said R.O.M. and said output suppression portion are constructed and connected to define in combination a multiply by two arrangement for doubling the number of clock pulse suppression signals being generated by said output suppression portion in response to the command signals from the input gating portion.

6. Digitalized linearizing correction circuitry according to claim 5 in which said multiply by two arrangement comprises first and second bistable devices, each having at least a pair of control inputs and an output, one control input of said first bistable device being operatively connected to the command signal output of said input gating portion, one control input of said second bistable device being operatively connected to the output of said first bistable device, both said bistable devices having second control inputs operatively responsive to the clock pulse generating means, and said R.O.M. generating a multiply by two signal which in combination with the output from said second bistable device generates a signal which is coupled to said first bistable device, whereby the output from said first bistable device is useful in suppressing the transmission of clock pulses from said linearizing circuitry to the pulse counting means.

7. Digitalized linearizing correction circuitry in combination with a pyrometer according to claim 1 in which said input means comprises a pair of paths connected in parallel, one of which includes a variable impedance for fine tuning one of said ramp signals, said input means being constructed and arranged such that said variable impedance has no significant influence upon the analog signal as seen by said integrating means.

8. Digitalized linearizing correction circuitry in combination with a pyrometer according to claim 1, in which there is provided control means coupled for response to a predetermined pulse count value from said pulse counting means and to an output from said integrating means for sequentially initiating and terminating said first and second ramp signals when said integrating means has an output value of a first predetermined level.

9. The combination according to claim 8 in which said control means includes dividing means whereby said predetermined pulse count value is greater than the maximum count capacity of said pulse counting means.

10. The combination according to claim 8 in which said control means includes reset means coupled for response to the attainment of said first level by said integrating means and having outputs connected to said pulse counting means and said linearizing circuitry for resetting same upon the attainment of said first level.

11. The combination according to claim 8 in which said control means is constructed to generate a strobing signal, said pulse counting means comprises BCD counting means, and there are provided pulse count latching means responsive to a strobing signal from the output of said control means for latching the count in the BCD counting means at the time of the strobing signal, and decoding and digitalized readout means for display of the latched pulse count.

12. The combination according to claim 8 in which said integrating means has, at its output, means for detecting said first predetermined level and a slide back detector for increasing the slewing rate of said level detector.

13. The combination according to claim 8 in which said input means includes a pair of parallel connected switches controlled by said control means such that said predetermined pulse count value is accumulated for the entire duration of said first ramp signal, which thereby terminates at a second level variable proportionately with respect to the temperature measurements, and said control means is arranged to effect a strobing of said pulse counting means when said second ramp signal attains said first level.

14. Digitalized linearizing correction circuitry according to claim 1 in which output lines of said R.O.M. are selectively connected to certain of the logic elements of said input gating portion, and said input gating portion is interconnected for response to said R.O.M. to define a symmetric pattern of the occurrences of the clock pulse suppression signals within each segment of the temperature range.

15. Digitalized linearizing correction circuitry according to claim 14 in which said R.O.M. is arranged to respond to the numeric inputs on its address lines to define each of the temperature range segments.

16. Digitalized linearizing correction circuitry according to claim 15 in which each of the range segments are equal to one another and each range segment defines a small portion of the total temperature range of the pyrometer.

* * * * *

Patent Attorneys' Supplies Division
Pengad Publishers, Bayonne, N.J.

UNITED STATES PATENT OFFICE
CERTIFICATE OF CORRECTION

Patent No. 3,824,585 Dated August 28, 1974

Inventor(s) ROBERT S. MEIJER

It is certified that error appears in the above-identified patent and that said Letters Patent are hereby corrected as shown below:

ABSTRACT, lines 10 and 11,"linearized" to --linearizing--. Column 2, line 51, after "receipt" change "of" to --by--. Column 3, line 36, change ",the" to --. The--. Column 5, line 56, change "$(\overline{CLK})$" to --(CLK)--; line 57, change "(CLK)" to --$(\overline{CLK})$--. Column 6, line 60, change "a" to --at--. Column 7, line 20, change "and" to --or--. Column 9, line 10, change "suppression" to --suppressing--.

Signed and sealed this 29th day of October 1974.

(SEAL)
Attest:

McCOY M. GIBSON JR.
Attesting Officer

C. MARSHALL DANN
Commissioner of Patents